US006996678B1

(12) United States Patent
Sharma (10) Patent No.: US 6,996,678 B1
(45) Date of Patent: Feb. 7, 2006

(54) METHOD AND APPARATUS FOR RANDOMIZED CACHE ENTRY REPLACEMENT

(75) Inventor: Rajan Sharma, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 10/210,138

(22) Filed: Jul. 31, 2002

(51) Int. Cl.
*G06F 12/00* (2006.01)

(52) U.S. Cl. .................. 711/133; 711/118; 711/119; 711/120; 711/121; 711/122; 711/133; 711/136; 712/204; 712/207; 712/239

(58) Field of Classification Search ............... 711/158, 711/118–146; 712/204, 207, 239
See application file for complete search history.

(56) References Cited

U.S. PATENT DOCUMENTS

| | | | |
|---|---|---|---|
| 6,161,167 A | 12/2000 | Witt | 711/136 |
| 6,385,699 B1 | 5/2002 | Bozman et al. | 711/133 |
| 6,490,654 B2 * | 12/2002 | Wickeraad et al. | 711/133 |
| 6,519,684 B1 * | 2/2003 | Moyer | 711/134 |
| 6,681,297 B2 * | 1/2004 | Chauvel et al. | 711/130 |
| 6,725,337 B1 * | 4/2004 | Tan et al. | 711/133 |
| 2002/0049918 A1 * | 4/2002 | Kaxiras et al. | 713/300 |
| 2002/0166029 A1 * | 11/2002 | Supnet | 711/136 |

OTHER PUBLICATIONS

Shyu et al., Apr. 28-May 2, 2002, IEEE, vol. 4, pp. 2232-2236.*
Jun Xu, Mukesh Singhal & Joanne Degroat, "A Novel Cache Architecture to Support Layer-Four Packet Classification at Memory Access Speeds," IEEE INFOCOM 2000, Nineteenth Annual Joint Conference Of The IEEE Computer And Communications Societies, Proceedings Tel Aviv, Israel, Mar. 26-30, 2000, pp. 1445-1454.

* cited by examiner

*Primary Examiner*—Donald Sparks
*Assistant Examiner*—Hashem Farrokh
(74) *Attorney, Agent, or Firm*—Campbell Stephenson Ascolese LLP; Samuel G. Campbell, III (57) ABSTRACT

A cache controller is disclosed. The cache controller includes potential replacement list, a plurality of valid bits and a number of counters. The potential replacement list includes a number of entries. Each of the valid bits corresponds to one of the entries. Each of the counters also corresponds to the one of the entries.

58 Claims, 6 Drawing Sheets

METHOD AND APPARATUS FOR RANDOMIZED CACHE ENTRY REPLACEMENT

BACKGROUND OF THE INVENTION

1. Field of the Invention

This invention relates to the field of information networks, and more particularly relates to a protocol for maintaining information regarding routes over a network.

2. Description of the Related Art

Generally, a router in a network uses routing tables to lookup a destination address to compute network routing and forward an incoming packet. Routing tables typically store millions of destination addresses for network hosts. Routing tables are periodically updated to reflect the active status of hosts in the network. When a packet arrives at a router, the router extracts the destination information from packet header and searches the routing table for the destination route. Because the routing tables are based on conventional memory technology and contain a large amount of routing information, a search for the destination route can take significant amount of time and in some cases, may cause the router to drop the incoming packet due to certain timeout limits.

One method to resolve route lookup delay is to implement a route cache. Typically, a route cache is a software-based search table. A route cache is a comparatively smaller lookup table that stores the addresses of certain selected destinations (e.g., most frequently accessed destinations, recently accessed destinations and the like). When the router receives a packet, the router first searches the route cache for routing information and if the routing information is found in the route cache, the router forwards the packet to the appropriate destination. Because the route cache is smaller, the search time is significantly less than the search time of larger lookup tables. The route cache is populated based on statistical and data traffic analysis done by each router in the network. A problem with software-based route caches is that the router keeps adding destination addresses to the route cache until the length of route cache reaches a certain maximum limit and the search efficiency starts degrading router's performance. The router then flushes the route cache (clears all the entries in the cache) and repopulates the route cache. The flushing and repopulating of the route cache causes additional delays for packet routing. This additional delay severely affects router performance and limits the maximum allowable throughput of the router.

One solution to this situation is the use of a hardware-based route cache. By storing the most frequently-used routing information in hardware, access to this information is hastened considerably. However, in this scenario, as with any caching scenario, a choice must be made as to which entries from the software-based routing tables to load into the hardware-based cache. As is known, least-recently used (LRU) techniques can provide good performance and relatively simple implementation to the question of page replacement. Of course, if all the page requests are known in advance, the best strategy is to evict that item whose next request occurs furthest in the future. This strategy is known as the MIN algorithm. Typically, it is not possible to know future requests. Techniques that assume no knowledge of future requests and base their decisions only on past requests are called online algorithms, of which the LRU technique is one. LRU works by replacing that page in the cache whose most recent request occurred furthest in the past, which is referred to as the oldest page. Heuristically, LRU's strategy is based on the assumption that the probability a given page will be accessed in the future is proportional to how recently that page was accessed for the last time in the past.

What is therefore needed is method and apparatus that allows for large routing tables through the use of a hardware cache, that do not experience the delays associated with software-based routing caches and the software control associated with such software-based routing caches.

SUMMARY

In one embodiment, a cache controller is disclosed. The cache controller includes potential replacement list, a plurality of valid bits and a number of counters. The potential replacement list includes a number of entries. Each of the valid bits corresponds to one of the entries. Each of the counters also corresponds to the one of the entries.

In another embodiment, a method for replacing a cache entry in a cache is disclosed. The method includes generating a random cache pointer value, storing the random cache pointer value in an entry of a potential replacement list, indicating that the entry is valid, and restarting a counter associated with the entry.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

Systems and methods according to embodiments of the present invention provide a randomized hardware scheme for cache entry replacement. Such systems and methods employ a potential replacement list that stores cache pointer values for cache entries that may potentially be replaced, invalidating entries that have been recently accessed, maintaining information regarding the age of each entry in the potential replacement list, and replacing invalidated entries with random cache pointer values. By doing so, such systems and methods are able to provide a least-recently used cache pointer value that can be used for purposes of replacing that entry in an associated cache. The structures used in such systems and methods provide a solution that improves the performance of the cache without consuming a comparatively large amount of chip area and without degrading the performance of a processor associated with the cache.

Example Hardware-Based Routing Cache

Figure 1:
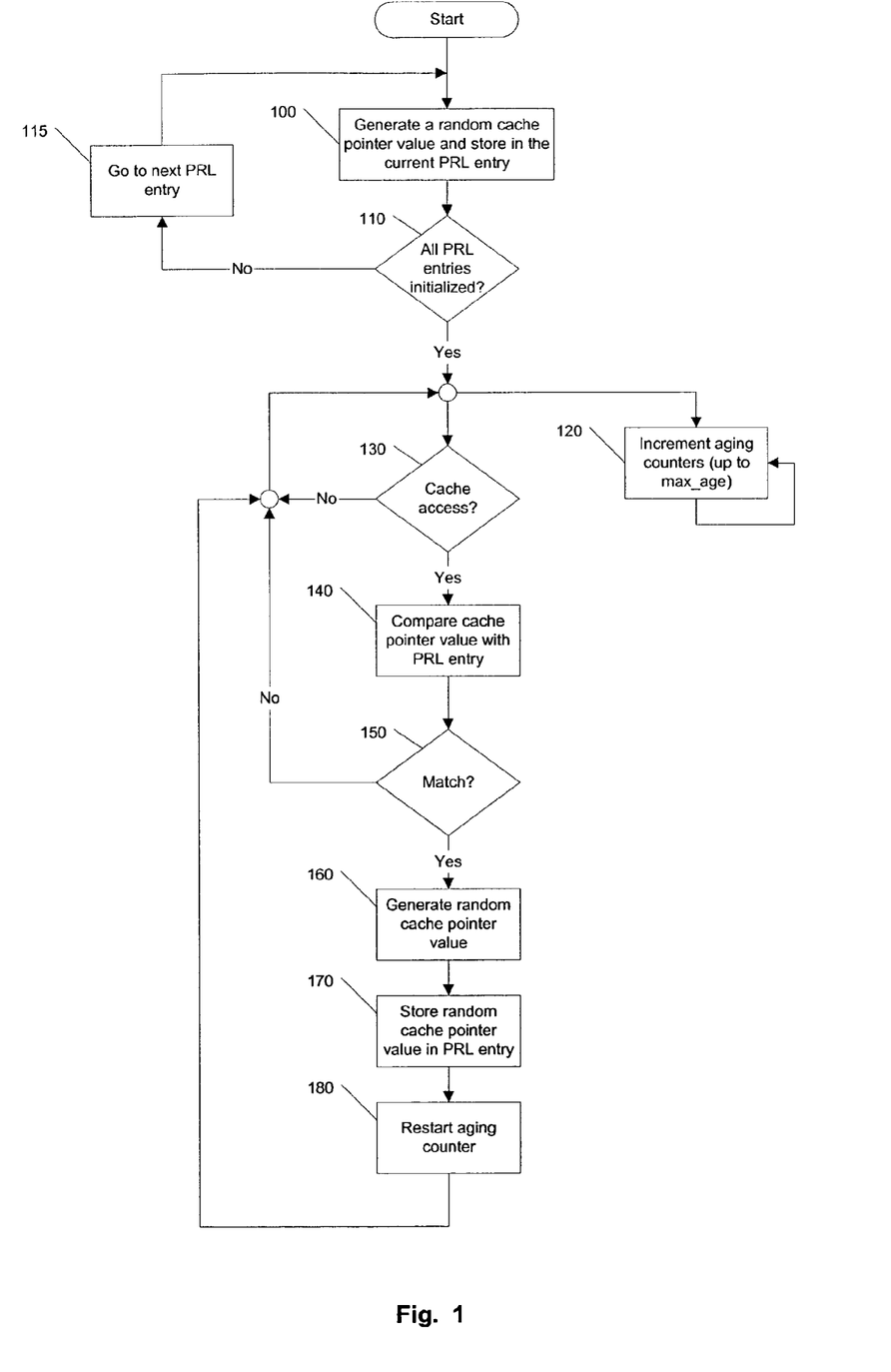
FIG. 1 is a flow diagram illustrating, generally, a randomized hardware scheme for cache replacement according to embodiments of the present invention.

FIG. 1 is a flow diagram illustrating, generally, a randomized hardware scheme for cache replacement according to embodiments of the present invention. The process illustrated in FIG. 1 begins with the generation of a random cache pointer value and its storage in a potential replacement list (PRL) entry (step 100). In fact, the PRL entry into which the random cache pointer value is stored is a current PRL entry, selected from the PRL's entries as the process initializes the PRL's entries. Next, a determination is made as to whether all the PRL entries have been initialized (step 110). If there are remaining PRL entries that require initialization, the process proceeds to the next of these PRL entries, and the initialization process continues (step 115).

Once all PRL entries have been initialized (step 110), the incrementing of aging counters is begun (step 120). The age of the cache pointer value stored in each PRL entry is maintained for use by the main body of the process illustrated in FIG. 1, up to a set limit (e.g., up to a maximum age limit (max_age)) (step 120).

While the age of the value stored in each PRL entry is maintained, a decision is made as to whether a cache access has occurred (step 130). While no cache accesses occur, the process awaits such an event. During this time, and even during cache accesses, the age of the cache pointer value stored in each PRL entry is maintained. During a cache access (step 130), the cache pointer value (which indicates which cache entry is being accessed) is compared with the cache pointer value stored in each of the PRL's entries (step 140). If none of the cache pointer values stored in the PRL match the cache pointer value of the cache access (step 150), the process loops back and awaits further cache accesses.

However, if the cache pointer value of the cache access matches one of the PRL entries' cache pointer values (step 150), a number of actions are taken. Among these is the generation of a random cache pointer value (step 160), the storage of that random cache pointer value in the PRL entry storing the cache pointer value matching the cache pointer value of the cache access (step 170), and the restarting of the counter corresponding to that PRL entry (step 180). As will be understood by one of skill in the art, the cache accesses processed in FIG. 1 are cache accesses in which information is being read from the cache.

As noted, FIG. 1 depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as a computer system 800, described subsequently. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 2:
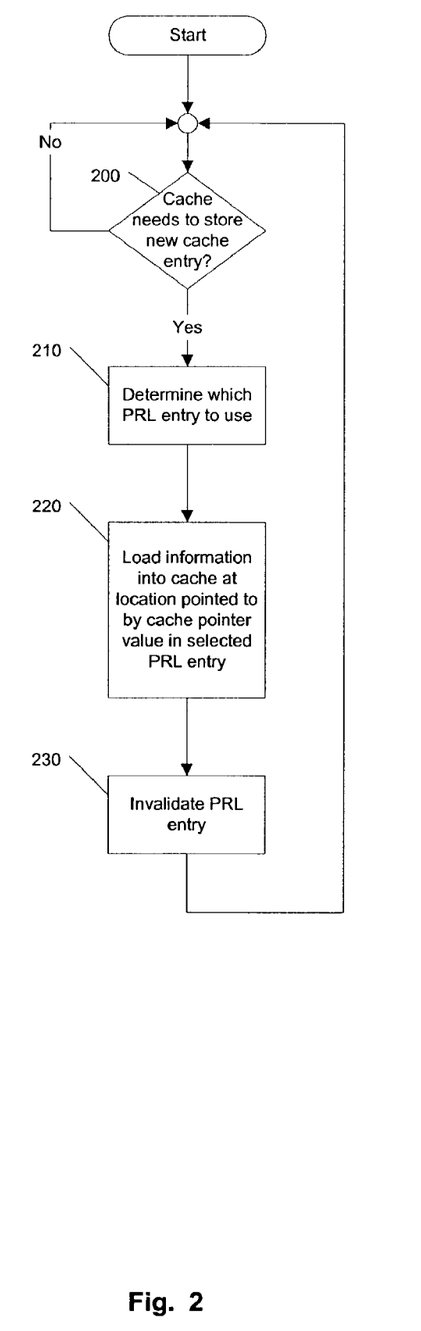
FIG. 2 is a flow diagram generally illustrating a process performed when a new cache entry is needed for writing data to the cache.

FIG. 2 is a flow diagram generally illustrating a process performed when a new cache entry is needed for writing data to the cache. This process waits for a cache write to occur, indicating that information needs to be stored in one of the cache's entries (step 200). While no new information needs to be stored in the cache, the process simply loops, awaiting a write to the cache (step 200). Upon the occurrence of a cache write, a determination is made as to which PRL entry's cache pointer value (and so cache location) to use is made by examining which of those PRL entries is least-recently used (step 210). Once the PRL entry containing the least-recently used cache pointer value (of those stored in the PRL) is identified, information is loaded into the cache pointed to by the cache pointer value in the selected PRL entry (step 220). Now that the selected PRL entry's cache pointer value has been used, the PRL entry is invalidated (step 230). This invalidation allows the now-defunct PRL entry to be loaded with a random cache pointer value for future use in subsequent writes to the cache.

Figure 3:
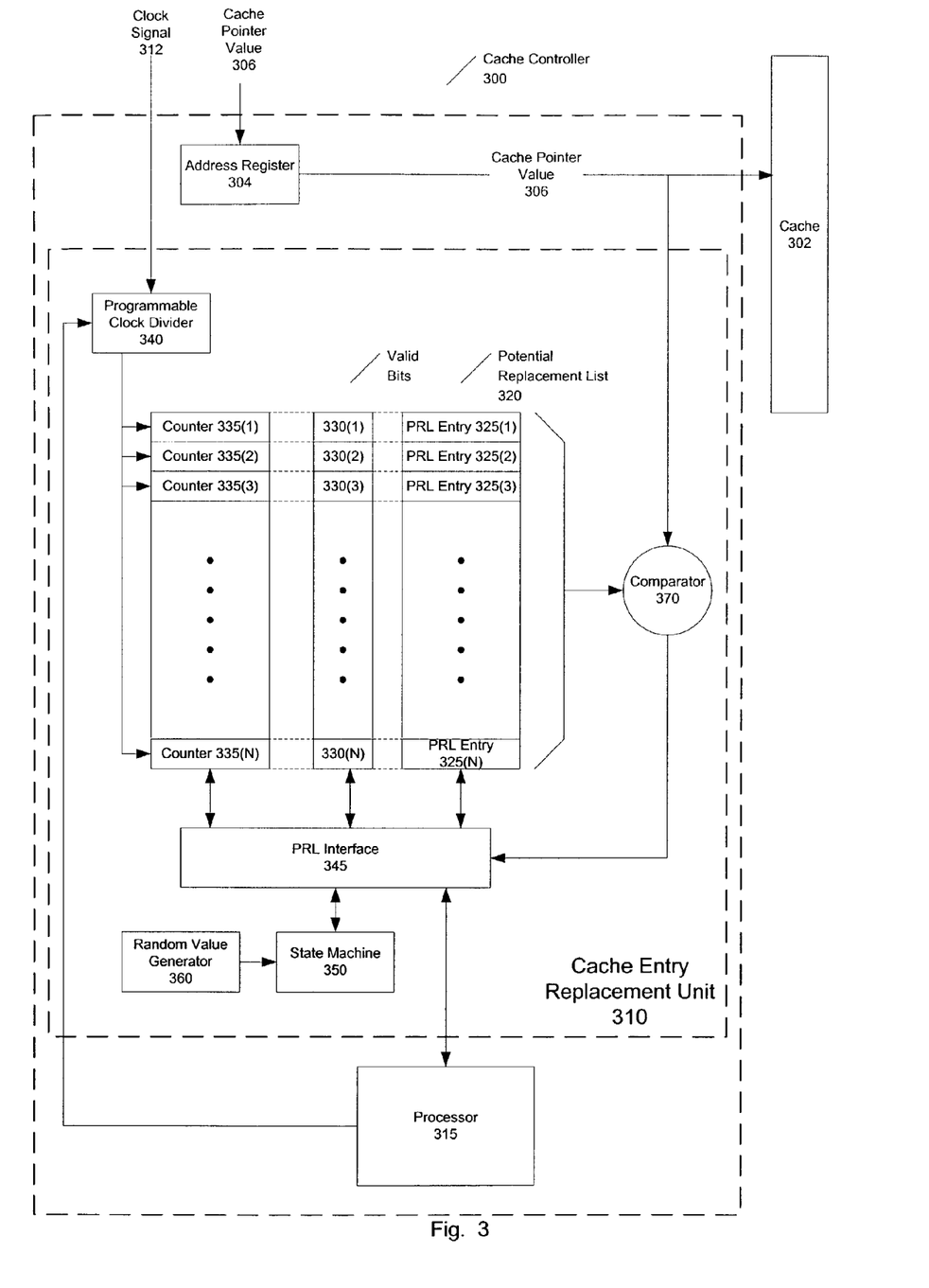
FIG. 3 is a block diagram of a cache controller according to embodiments of the present invention.

FIG. 3 is a block diagram of a cache controller 300. Cache controller 300 controls a cache 302, and includes an address registry 304, which is configured to store a cache pointer value 306 and to provide cache pointer value 306 to cache 302 and a cache entry replacement unit (CERU) 310, in order to implement a technique according to the present invention. CERU 310 is configured to receive a clock signal 312 and to be controlled by a processor 315. At the heart of CERU 310 is a potential replacement list (PRL) 320, which, in turn, is made up of a number of PRL entries (illustrated in FIG. 3 as PRL entries 325(1)-(N)). Associated with each of PRL entries 325(1)-(N) is one of valid bits 330(1)-(N) and one of counters 335(1)-(N). Valid bits 330(1)-(N) allow for the determination of the validity of the cache pointer value stored in a corresponding one of PRL entries 325(1)-(N). Counters 335(1)-(N) allow for a determination as to the age of the cache pointer value stored in a corresponding one of PRL entries 325(1)-(N). Each of counters 335(1)-(N) is coupled to a programmable clock divider 340 which receives clock signal 312 and is controlled by processor 315.

This control of counters 335(1)-(N) via clock divider 340 allows for the control (e.g., by software) of the speed with which counters 335(1)-(N) are incremented. PRL 320 as well as valid bits 330(1)-(N) and counters 335(1)-(N) are also accessible by processor 315 via a PRL interface 345. These features allow for a great deal of flexibility, beyond what is inherent in CERU 310 as shown. For example, in addition to being able to adjust the rate at which counters 335(1)-(N) saturate (and so the number of replaceable cache entries indicated), processor 315 can pre-load values into counters 335(1)-(N), validate/invalidate certain of PRL entries 325(1)-(N) based on other criteria and perform other such tasks with regard to the control and operation of CERU 310. It should also be noted that, in the case of replacement of cache entries, while the hardware of CERU 310 is capable of updating PRL 320, processor 315 is also capable of doing so, and can, either as the preferred method, or as a backup to the hardware of CERU 310 updating PRL 320. Thus, by allowing processor 315 to access and control CERU 310, a wide array of analyses and range of control can be exercised over the cache entry replacement process.

PRL interface 345 also supports access to PRL 320, valid bits 330(1)-(N) and counter 335(1)-(N) by a state machine 350. State machine 350 provides for the initialization of potential replace list 320 and associated structures as well as for the storing of random cache pointer values in PRL 320, the clearing and setting of valid bits 330(1)-(N) and the resetting of counters 335(1)-(N). With regard to the storage of random cache pointer values, state machine 350 supports such operations, in part, by being coupled to a random value generator 360. Random value generator 360, as its name implies, generates random cache pointer values for storage in PRL 320. CERU 310 also supports the invalidation of one or more PRL entries 325(1)-(N) by comparing cache pointer value 306 to each of PRL entries 325(1)-(N) using a comparator 370.

In the manner discussed in relation to FIG. 1, CERU 310 operates to maintain cache pointer values for replacement of cache entries. State machine 350 can be design and operated in a number of ways, but an advantageous manner (due to its simplicity) is to simply cause state machine 350 to replace invalidated PRL entries by checking each PRL entry's associated valid bit, and if that valid bit indicates that the PRL entry is invalid, replacing the cache pointer value stored in the PRL entry with a random cache pointer value generated by random value generator 360, restarting the counter associated with the PRL entry (i.e., restarting the count from some initial value (e.g., 0)) and setting the valid bit to indicate that the cache pointer value stored in the PRL entry is valid. When a cache read occurs that matches a cache pointer value stored in one of the PRL entries, that entry is invalidated and the preceding process occurs, once state machine 350 gets to the invalidated PRL entry. When a cache write occurs, CERU 310 (either through the hardware structures therein, or by software executed on processor 315)

selects one of PRL entries 325(1)-(N) based on which of the cache pointer values stored in PRL entries 325(1)-(N) is the least-recently used, among other possible criteria. Once this occurs, the selected PRL entry is invalidated, and the previously-described process of validating the PRL entry is performed. The focus here is the time for which a given cache pointer value has been valid.

This also allows CERU 310 to dynamically react to changes in traffic flows. As traffic patterns change, for example, the destination addresses stored in cache 302 can change. This is reflected by the replacement of cache pointer values in PRL 320. Moreover, because the counters' rates are controlled by processor 315, CERU 310 can dynamically react to such changes. This is referred to herein as dynamic replacement refresh, and allows control over the periodicity of checking a PRL entry for invalidity, the rate at which PRL entries are aged and so on. It should be noted that, rather than a counter, a "used bit" could be employed in determining which cache pointer values should be replaced. However, this alternative suffers from an inability to distinguish between valid entries, lacking information as to which of the valid entries is best replaced.

Figure 4:
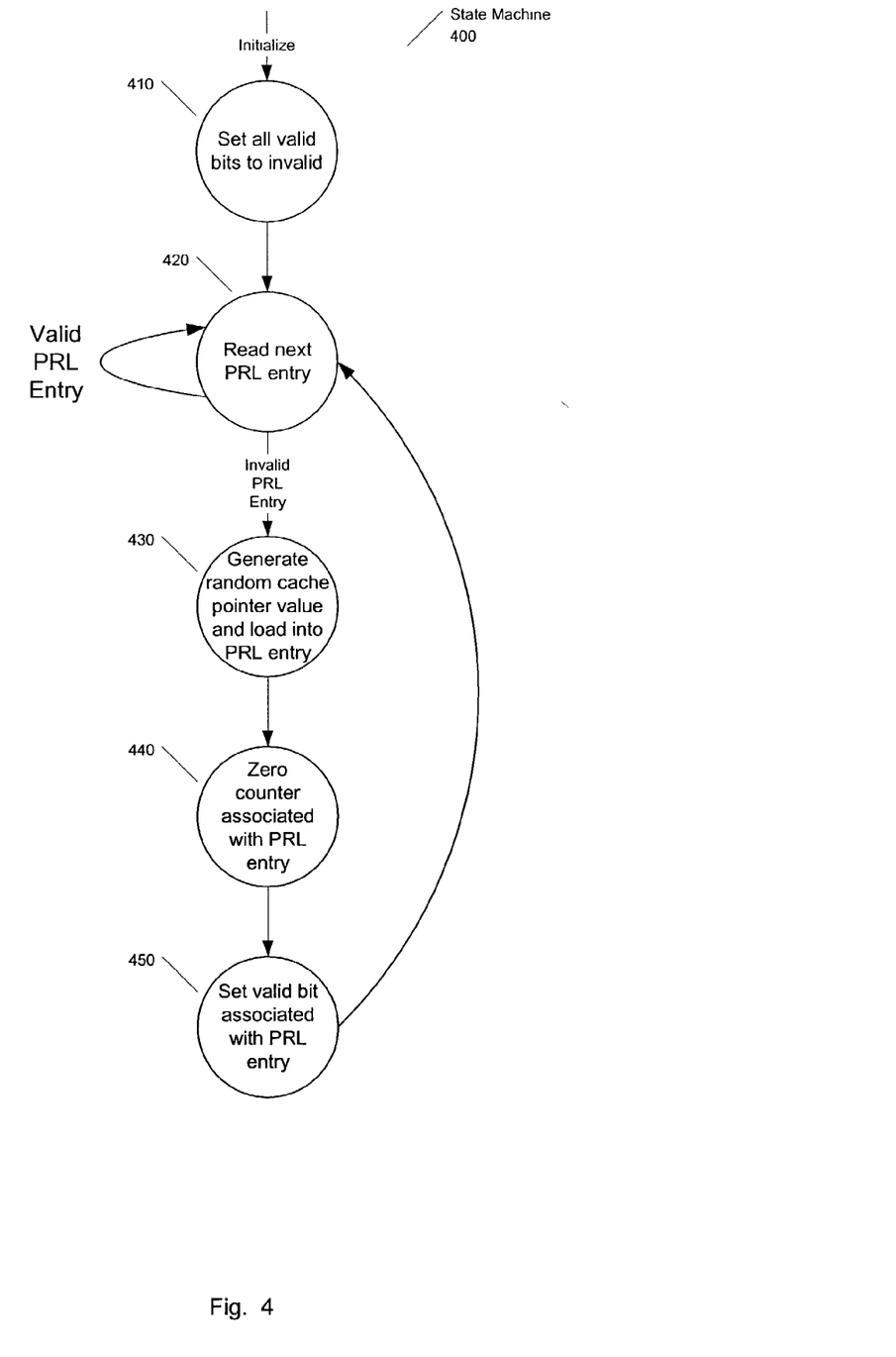
FIG. 4 illustrates a state machine that describes the states and transitions implemented according to embodiments of the present invention.

FIG. 4 illustrates a state machine 400 that describes the states and transitions implemented by state machine 350. Upon initialization, state machine 400 proceeds to a state 410 in which all valid bits 330(1)-(N) are set to invalid. This allows the state machine to be simplified because, instead of having a separate set of states to initialize PRL entries 325(1)-(N), state machine 400 can simply be designed to address those of PRL entries 325(1)-(N) for which a corresponding one of valid bits 330(1)-(N) indicates an invalid entry. Thus, during the first pass through PRL 320 by state machine 400, PRL entries 325(1)-(N) are initialized as a result of their corresponding valid bits indicating an invalid cache pointer value stored therein. State machine 400 thus proceeds with the reading of one of PRL entries 325(1)-(N) at a state 420 (in which the next PRL entry is read, generally). If the valid bit corresponding to that PRL indicates that the PRL entry is valid, state machine 400 simply cycles back to state 420, reading the next PRL entry. In the case where the valid bit corresponding to the PRL entry indicates that the PRL entry is invalid (e.g., that the PRL entry's cache pointer value points to a recently-accessed cache location or a PRL entry requiring initialization), state machine 400 proceeds to a state 430.

At state 430, a random cache pointer value is generated by a random value generator (e.g., random value generator 360) and loaded into the PRL entry (e.g., by state machine 350 via PRL interface 345). Next, state machine 400 proceeds to a state 440, where the counter associated with the PRL entry is cleared. It will be apparent to one of skill in the art that the counter associated with PRL entries 325(1)-(N) (e.g., counters 335(1)-(N)) can be designed in a number of ways, including as count-up counters, count-down counters and other such designs. State machine 400 then proceeds to a state 450, in which the valid bit associated with the PRL entry is set to indicate that a valid cache pointer value has been stored therein.

It should be noted that, while the implementation of state machine 400 in hardware is typically preferable, such need not be the case. In fact, the state machine (and it's associated random value generator) can be implemented in software (e.g., executed by a processor such as processor 315). In that case, processor 315 provides the functionality of state machine 350 and random value generator 360, and interfaces with PRL 320, valid bits 330(1)-(N) and counters 335(1)-(N) via PRL interface 345 in a similar manner, as well. However, implementing CERU 310 entirely in software would decrease its performance, as replacement of invalid cache entries could only be performed infrequently, in relative terms, thus impacting the "dynamic-ness" of the solution provided by the present invention. By implementing randomized cache entry replacement in hardware, dynamic behavior of the cache entry replacement operation can be achieved, which cannot be done with sofware alone for packet processing applications.

Figure 5:
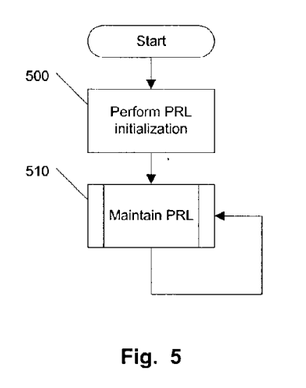
FIG. 5 is a generalized flow diagram that depicts the major actions performed by the hardware illustrated in FIG. 3.

FIG. 5 is a generalized flow diagram that depicts the major actions performed by the hardware illustrated in FIG. 3. The process is made up of two main actions. The first of these is the initialization of a PRL (e.g., PRL 320) (step 500). Once initialized, actions by the associated processor (e.g., processor 315) and associated state machine (e.g., state machine 350) and associated support circuitry (e.g., the associated circuitry of CERU 310) maintains the PRL in accordance with embodiments of the present invention (step 510).

Figure 6A:
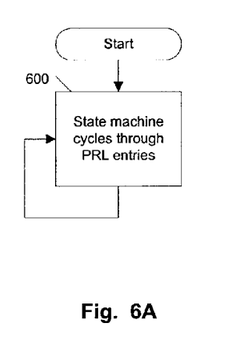
FIGS. 6A, 6B and 6C provide further detail as to the maintenance of the a potential replacement list.
Figure 6B:
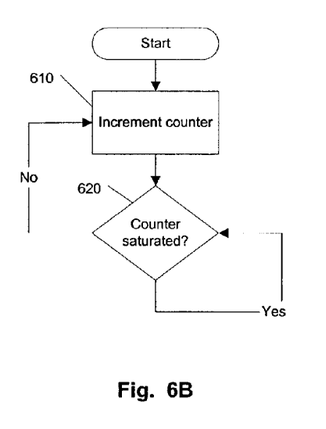
Figure 6C:
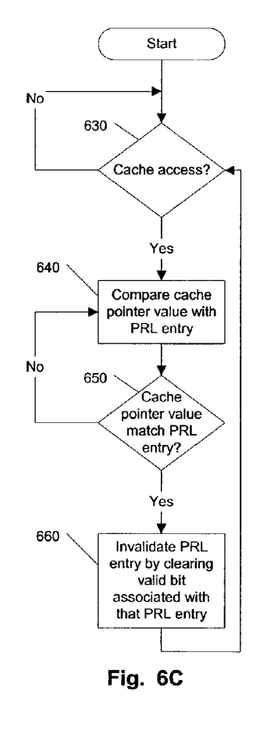

FIGS. 6A, 6B and 6C provide further detail as to the maintenance of the PRL. It should be noted that the processes depicted in FIGS. 6A, 6B and 6C are not exclusive to one another, but, in fact, typically proceed in parallel with one another. FIG. 6A is a high level illustration of the actions performed by a state machine according to the present invention (as exemplified by state machine 400 of FIG. 4). As noted in the discussion of FIG. 4, state machine 400 simply cycles through the PRL entries, loading random cache pointer values into any PRL entries that may have been invalidated (step 600).

FIG. 6B is a flow diagram illustrating the operation of a counter such as one of counters 335(1)-(N). Each of counters 335(1)-(N) receives a count signal from programmable clock divider 340, which divides clock signal 312. Programmable clock divider 340 is controlled by processor 315, which loads programmable clock divider 340 with a value indicating the amount by which clock signal 312 should be divided. Counters 335(1)-(N) thus count at this rate (step 610). So long as a given counter has not saturated (i.e., reached some maximum value), the count held by the counter continues to be updated (e.g., incremented) at the rate defined by the output of programmable clock divider 340 (step 620). Once this maximum value is reached, however, the given counter saturates, and ceases further counting (step 620). Ideally, programmable clock divider 340 is set by processor 315 to divide clock signal 312 by an amount that leads to a minimum number of counters 335 (1)-(N) saturating. It will therefore be noted that, as the divisor loaded into programmable clock divider 340 is increased (and so the rate at which counters 335(1)-(N) are incremented is slowed), the fewer of counters 335(1)-(N) will saturate. Conversely, the smaller the divisor loaded into the programmable clock divider 340 (and so the faster counters 335(1)-(N) are incremented), the greater number of counters 335(1)-(N) will saturate. Such effects allow a divisor to be chosen (e.g., empirically) such that the appropriate PRL entry can be chosen. For example, a divisor can be chosen such that the counters rarely saturate, and so the PRL entry having the highest count is chosen. Alternatively, a divisor can be chosen such that several of the counters saturate, allowing a selection to be made between those counters using some selection criteria (e.g., first found, last found, random selection, and so on). Other such paradigms are also possible. Thus, analyses can be performed to learn how the system reacts to certain situations (e.g., certain traffic patterns).

FIG. 6C is a flow diagram illustrating the process performed by CERU 310 when awaiting and processing an access of cache 302. The process begins with CERU 310 awaiting a cache access (step 630). Upon cache 302 being accessed (step 630), a comparison is made between the cache pointer value provided by address register 304 and the cache pointer values stored in PRL 320 (e.g., by comparator 370) (step 640). Comparator 370 compares the cache pointer value provided to cache 302 with each of PRL entries 325(1)-(N). This comparison can be accomplished in a number of ways.

As depicted in FIG. 6C, comparator 370 cycles through each of PRL entries 325(1)-(N), comparing the cache pointer value provided to cache 302 with each PRL entry (step 640), making a determination as to whether the cache pointer value provided to cache 302 matches the cache pointer value stored in the given PRL entry (step 650). Alternatively, the operation could be performed by structuring PRL 320 as a content-accessible memory (CAM). In that case, the cache pointer value provided to cache 302 would be provided to PRL 320, and an indication provided at location of a matching cache pointer value (if any) generated by the CAM of PRL 320. Though this is the method chosen to identify matching PRL entries, once thus matched, the PRL entry is invalidated (e.g., by clearing its associated valid bit), as note earlier (step 660).

Figure 7:
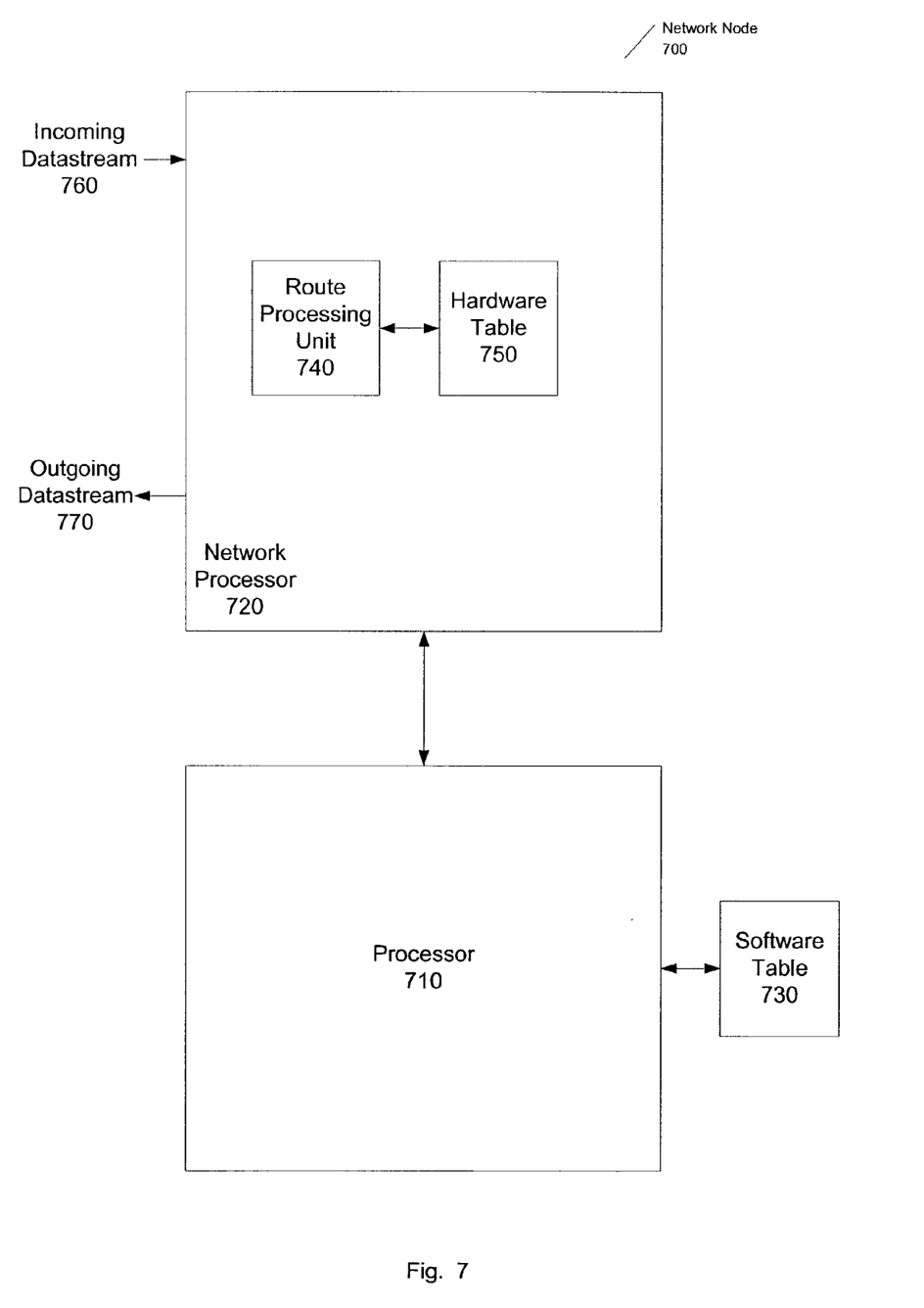
FIG. 7 is a block diagram of an example networking system configured to support a cache entry replacement technique according to embodiments of the present invention.

FIG. 7 is a block diagram of an example networking system configured to support a cache entry replacement technique according to embodiments of the present invention. A network node 700 is depicted as including a processor 710 and a network processor 720. As will be apparent to one of skill in the art, network node 700 can be a router or other piece of network equipment capable of employing embodiments of the present invention. Along these lines, network processor 720 can be a fully-custom integrated circuit (IC), a gate array or other application-specific IC (ASIC), a programmed field-programmable gate array (FPGA), discrete components or any other form of hardware. As depicted in FIG. 7, processor 710 has access to a software table 730, which can contain, for example, destination addresses for incoming packets. Software table 730 may be stored in a variety of ways, including in main memory, on disk storage or in some other fashion. As can also be seen in FIG. 7, network processor 720 includes a router processing unit 740, which is coupled to a hardware table 750. Hardware table 750 will typically hold some subset of the entries (e.g., destination addresses) held in software table 730. Route processing unit 740, together with hardware table 750, can be viewed as making up and containing the structures depicted in FIG. 3 that effect the operations of the present invention. Network processor 720 receives an incoming datastream 760 and processes that data stream (using route processing unit 740 and hardware table 750) to generate an outgoing datastream 770.

It became apparent to the inventor that the situation depicted in FIG. 7 paralleled that of a cache in many regards. In networking scenarios, software table 730 will typically have on the order of a million or more entries, while hardware table 750 will have something on the order of about a quarter of a million entries, and hold a subset of the entries (e.g., destination addresses) held in software table 730, as noted. Thus, because hardware table 750 can in no way hold all the possible entries, it is desirable to keep only those entries in hardware table 750 that are most likely to be used (e.g., in forwarding packets to subsequent network nodes and/or onto their final destination). Moreover, the (destination) information stored in hardware table 750 is dynamic, because the traffic flows (and so destinations) are dynamic, thus requiring that the information stored in hardware table 750 change over time. In this way, hardware table 750 acts as something of a cache for the information stored in software table 730, and so would be expected to benefit from the methods and apparati described herein.

It should be noted that, in fact, it is possible to simply move software table 730 on-chip to network processor 720. However, this is an extremely expensive solution, at least in terms of the chip area consumed by such a large table, as well as restrictive with regard to expandability of such a table. Alternatively, the table could be held in off-chip hardware, but this greatly increases the complexity of network processor 720 due to the need for an additional (high-speed) interface, as well as adding additional on-board components (which incurs added cost, consumes PCB area, and so on). Relying solely on software table 730 is also undesirable due to slower performance, increased computational load on processor 710, and so on.

The success of such an approach hinges on being able to provide at least one saturated entry in most cases, or at least being able to determine which of the entries is least-recently used, based on the fact that one or more entries have counts that are nearest the given limit. The inventor's analysis shows that even with a small number of PRL entries (e.g., 32), this is the case.

As will be apparent to one of skill in the art, performance of such a system depends on cache access patterns. The following assumption is made to simplify the analysis: regardless of the distribution, there is a way of devising a metric such that each entry can classified as either "replaceable" or "non-replaceable" and that from the perspective of a comparatively long timeframe, simple probability values can be calculated for picking at random a "replaceable" entry, which is referred to as p.

For example, at initialization, if 32 cache pointer values are chosen at random, the probability that none of them is a "replaceable" entry is $$y=(1-p)^{32}$$

Due to the exponential nature of the equation, y is likely to be a very small number. If p=0.2, y=0.0008 and if p=0.5, y=2.3×10$^{-10}$. Further, because a process according to the present invention is dynamic, and "not replaceable" entries are purged and replaced as soon as such entries are discovered, the formula above represents only a conservative upper bound on the actual value of y. The only requirement is that the counter period is chosen carefully so that "non-replaceable" entries have a great enough chance of being purged, which in practice has proven to be a relatively simple goal to achieve. Because only a relatively small PRL is therefore needed to achieve acceptable performance, the chip area consumed by such a solution is small, relative terms (especially when compared to a cache the size of the software table). Thus, a PRL cache entry replacement strategy according to the present invention provides a low-cost, hardware-based solution that is particularly well suited for software tables with large numbers of entries.

Moreover, while application of the present invention has been discussed in terms of routing tables and destinations (which is an important application of the present invention), the present invention can, in a networking environment, be extended to tables with any other kind of information that may be required to process packets. For example, the present invention can be used with source information tables (e.g., those tables used for detecting fake packets being sent by hackers).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A cache controller comprising:
a potential replacement list comprising a plurality of entries, wherein each of said entries is capable of storing a random cache pointer value;
a plurality of valid bits, wherein each of said valid bits corresponds to a one of said entries;
a state machine, wherein said state machine is coupled to said potential replacement list; and
said state machine is configured to store said random cache pointer value in a one of said entries; and
a plurality of counters, wherein each of said counters corresponds to said one of said entries.

2. The cache controller of claim 1, further comprising:
a comparator, wherein
said comparator is coupled to said entries, and
said comparator is configured to receive a cache pointer value.

3. The cache controller of claim 2, wherein said comparator is configured to compare said cache pointer value to a random cache pointer value stored in at least one of said entries, and said comparator is configured to invalidate said at least one of said entries, if said cache pointer value matches said random cache pointer value stored in said at least one of said entries.

4. The cache controller of claim 3, wherein
said comparator is configured to invalidate said at least one of said entries by virtue of being configured to clear at least one of said valid bits corresponding to said at least one of said entries.

5. The cache controller of claim 2, further comprising:
a random number generator configured to generate said random cache pointer value, wherein
said state machine is coupled to said random number generator and is further configured to replace a cache pointer value stored in an invalidated one of said entries with said random cache pointer value.

6. The cache controller of claim 5, wherein said state machine is configured to replace said cache pointer value stored in said invalidated one of said entries with said random cache pointer value by virtue of being configured to read said one of said entries; and
if said one of said entries is invalidated, load said random cache pointer value into said one of said entries, clear a one of said counters associated with said one of said entries, and set a one of said valid bits associated with said one of said entries.

7. The cache controller of claim 1, further comprising:
a programmable clock divider, coupled to said counters and a clock signal, wherein
said programmable clock divider is configured to control a counting rate at which said counters count.

8. The cache controller of claim 1, wherein each of said counters is a saturating counter.

9. The cache controller of claim 8, wherein said counting rate controls a rate at which said counters saturate.

10. The cache controller of claim 1, further comprising:
a programmable clock divider, coupled to said counters and a clock signal, wherein
each of said counters is a saturating counter, and
said programmable clock divider is configured control a counting rate at which said counters count, and
a processor, coupled to said potential replacement list and said programmable clock divider, wherein
said processor is configured to configure said programmable clock divider to control a saturation rate of said counters.

11. The cache controller of claim 10, further comprising:
a comparator, wherein
said comparator is coupled to said entries,
said comparator is configured to receive a cache pointer value and to compare said cache pointer value to a random cache pointer value stored in at least one of said entries, and
said comparator is configured to invalidate said at least one of said entries, if said cache pointer value matches said random cache pointer value stored in said at least one of said entries,
a random number generator configured to generate a random cache pointer value, wherein
said state machine is coupled to said random number generator and is further configured to replace a cache pointer value stored in an invalidated one of said entries with said random cache pointer value, and
said processor comprises said state machine and said random number generator.

12. The cache controller of claim 11, wherein said state machine and said random number generator are implemented in software and said processor is configured to execute said software.

13. A method for replacing a cache entry in a cache comprising:
if an entry of a potential replacement list has been invalidated, generating a random cache pointer value;
storing said random cache pointer value in said entry;
indicating that said entry is valid; and
restarting a counter associated with said entry.

14. The method of claim 13, wherein said indicating comprises:
setting a valid bit associated with said entry.

15. The method of claim 13, further comprising:
comparing a cache pointer value with a cache pointer value stored in said entry; and
if said cache pointer value matches said cache pointer value stored in said entry, invalidating said entry.

16. The method of claim 15, further comprising:
invalidating said entry by clearing a valid bit associated with said entry.

17. The method of claim 15, further comprising:
comparing another cache pointer value with said cache pointer value stored in said entry;
if said another cache pointer value matches said cache pointer value stored in said entry, invalidating said entry; and
if said entry has been invalidated;
generating another random cache pointer value;
storing said another random cache pointer value in said entry, indicating that said entry is valid; and
restarting said counter.

18. The method of claim 13, further comprising:
causing said counter to stop counting upon said counter reaching a limit.

19. The method of claim 18, wherein said causing comprises:
incrementing said counter until said counter reaches a maximum count.

20. The method of claim 13, wherein
said entry is one of a plurality of entries, and
a valid bit and a counter are associated with each of said entries.

21. The method of claim 20, further comprising:
examining a plurality of said counters to identify an associated one of said entries that contains a least-recently used cache pointer value.

22. The method of claim 21, wherein said examining is performed when said cache is to be written to.

23. The method of claim 21, further comprising:
invalidating said associated one of said entries by clearing a valid bit associated with said associated one of said entries.

24. The method of claim 21, further comprising:
generating another random cache pointer value;
storing said another random cache pointer value in said associated one of said entries;
indicating that said associated one of said entries is valid by setting a one of said valid bits associated with said associated one of said entries; and
restarting a counter associated with said associated one of said entries.

25. The method of claim 20, further comprising:
examining each of said valid bits; and
if said each of said valid bits indicates that an associated one of said entries is invalid;
generating another random cache pointer value;
storing said another random cache pointer value in said associated one of said entries;
setting said each of said valid bits to indicate said associated one of said entries is valid; and
restarting a counter associated with said associated one of said entries.

26. The method of claim 20, further comprising:
causing each of said counters to stop counting upon said each of said counters reaching a limit.

27. A network element comprising:
a processor;
a cache coupled to said processor;
computer readable medium coupled to said processor; and
computer code, encoded in said computer readable medium, for replacing a cache entry in said cache and configured to cause said processor to:
if an entry of a potential replacement list has been invalidated, generate a random cache pointer value;
store said random cache pointer value in said entry;
indicate that said entry is valid; and
restart a counter associated with said entry.

28. The network element of claim 27, wherein said computer code that indicates further comprises computer code that is configured to cause said processor to:
set a valid bit associated with said entry.

29. The network element of claim 27, wherein said computer code is further configured to cause said processor to:
compare a cache pointer value with a cache pointer value stored in said entry; and
invalidate said entry, if said cache pointer value matches said cache pointer value stored in said entry.

30. The network element of claim 29, wherein said computer code is further configured to cause said processor to:
invalidate said entry by clearing a valid bit associated with said entry.

31. The network element of claim 29, wherein said computer code is further configured to cause said processor to:
compare another cache pointer value with said cache pointer value stored in said entry;
if said another cache pointer value matches said cache pointer value stored in said entry, invalidate said entry; and
if said entry has been invalidated;
generate another random cache pointer value;
store said another random cache pointer value in said entry;
indicate that said entry is valid; and
restart said counter.

32. The network element of claim 27, wherein said computer code is further configured to cause said processor to:
cause said counter to stop counting upon said counter reaching a limit.

33. The network element of claim 32, wherein said computer code that causes said counter to stop counting further comprises computer code that is configured to cause said processor to:
increment said counter until said counter reaches a maximum count.

34. The network element of claim 27, wherein
said entry is one of a plurality of entries, and
a valid bit and a counter are associated with each of said entries.

35. The network element of claim 34, wherein said computer code is further configured to cause said processor to:
examine a plurality of said counters to identify an associated one of said entries that contains a least-recently used cache pointer value.

36. The network element of claim 35, wherein said computer code is further configured to cause said processor to:
generate another random cache pointer value;
store said another random cache pointer value in said associated one of said entries;
indicate that said associated one of said entries is valid by setting a one of said valid bits associated with said associated one of said entries; and
restart a counter associated with said associated one of said entries.

37. The network element of claim 34, wherein said computer code is further configured to cause said processor to:
examine each of said valid bits; and
if said each of said valid bits indicates that an associated one of said entries is invalid;
generate another random cache pointer value;
store said another random cache pointer value in said associated one of said entries;
set said each of said valid bits to indicate said associated one of said entries is valid; and
restart a counter associated with said associated one of said entries.

38. A computer program product comprising:
a first set of instructions, executable on a computer system, configured to generate a random cache pointer value;
a second set of instructions, executable on said computer system, configured to store said random cache pointer value in an entry of a potential replacement list;
a third set of instructions, executable on said computer system, configured to indicate that said entry is valid;
a fourth set of instructions, executable on said computer system, configured to restart a counter associated with said entry; and
computer readable media, wherein
said computer program product is encoded in said computer readable media
said computer program product is configured to execute said first, said second, said third and said fourth sets of instructions, if said entry has been invalidated.

39. The computer program product of claim 38, wherein said third set of instructions comprises:
a first subset of instructions, executable on said computer system, configured to set a valid bit associated with said entry.

40. The computer program product of claim 38, further comprising:

a fifth set of instructions, executable on said computer system, configured to compare a cache pointer value with a cache pointer value stored in said entry; and a sixth set of instructions, executable on said computer system, configured to invalidate said entry, if said cache pointer value matches said cache pointer value stored in said entry.

41. The computer program product of claim 40, further comprising:

a seventh set of instructions, executable on said computer system, configured to invalidate said entry by clearing a valid bit associated with said entry.

42. The computer program product of claim 40, further comprising:

an eighth set of instructions, executable on said computer system, configured to compare another cache pointer value with said cache pointer value stored in said entry;

a ninth set of instructions, executable on said computer system, configured to, if said another cache pointer value matches said cache pointer value stored in said entry, invalidate said entry; and a tenth set of instructions, executable on said computer system, configured to, if said entry has been invalidated;

generate another random cache pointer value;

store said another random cache pointer value in said entry;

indicate that said entry is valid; and restart said counter.

43. The computer program product of claim 38, further comprising:

a fifth set of instructions, executable on said computer system, configured to cause said counter to stop counting upon said counter reaching a limit.

44. The computer program product of claim 43, wherein said fifth set of instructions comprises:

a first subset of instructions, executable on said computer system, configured to increment said counter until said counter reaches a maximum count.

45. The computer program product of claim 38, wherein said entry is one of a plurality of entries, and a valid bit and a counter are associated with each of said entries.

46. The computer program product of claim 45, further comprising:

a fifth set of instructions, executable on said computer system, configured to examine a plurality of said counters to identify an associated one of said entries that contains a least-recently used cache pointer value.

47. The computer program product of claim 46, further comprising:

a sixth set of instructions, executable on said computer system, configured to generate another random cache pointer value;

a seventh set of instructions, executable on said computer system, configured to store said another random cache pointer value in said associated one of said entries;

a eighth set of instructions, executable on said computer system, configured to indicate that said associated one of said entries is valid by setting a one of said valid bits associated with said associated one of said entries; and a ninth set of instructions, executable on said computer system, configured to restart a counter associated with said associated one of said entries.

48. The computer program product of claim 45, further comprising:

a fifth set of instructions, executable on said computer system, configured to examine each of said valid bits; and a sixth set of instructions, executable on said computer system, configured to if said each of said valid bits indicates that an associated one of said entries is invalid;

generate another random cache pointer value;

store said another random cache pointer value in said associated one of said entries;

set said each of said valid bits to indicate said associated one of said entries is valid; and restart a counter associated with said associated one of said entries.

49. An apparatus for replacing a cache entry in a cache comprising:

means for generating a random cache pointer value;

means for storing said random cache pointer value in an entry of a potential replacement list;

means for indicating that said entry is valid; and means for restarting a counter associated with said entry, wherein said means for generating, said means for storing, said means for indicating and said means for restarting are configured to perform their respective functions if said entry has been invalidated.

50. The apparatus of claim 49, wherein said indicating means comprises:

means for setting a valid bit associated with said entry.

51. The apparatus of claim 50, further comprising:

means for comparing a cache pointer value with a cache pointer value stored in said entry; and means for invalidating said entry, if said cache pointer value matches said cache pointer value stored in said entry.

52. The apparatus of claim 51, further comprising:

means for invalidating said entry by clearing a valid bit associated with said entry.

53. The apparatus of claim 49, further comprising:

means for causing said counter to stop counting upon said counter reaching a limit.

54. The apparatus of claim 53, wherein said causing means comprises:

means for incrementing said counter until said counter reaches a maximum count.

55. The apparatus of claim 49, wherein said entry is one of a plurality of entries, and a valid bit and a counter are associated with each of said entries.

56. The apparatus of claim 55, further comprising:

means for examining a plurality of said counters to identify an associated one of said entries that contains a least-recently used cache pointer value.

57. The apparatus of claim 56, further comprising:

means for invalidating said associated one of said entries by clearing a valid bit associated with said associated one of said entries.

58. The apparatus of claim 56, further comprising:

means for causing each of said counters to stop counting upon said each of said counters reaching a limit.

* * * * *